(12) United States Patent
Hach et al.

(10) Patent No.: US 9,983,292 B2
(45) Date of Patent: May 29, 2018

(54) METHOD AND SYSTEM FOR MULTIPATH REDUCTION FOR WIRELESS SYNCHRONIZING AND/OR LOCATING

(75) Inventors: Rainer Hach, Berlin (DE); Albrecht Rommel, München (DE)

(73) Assignee: NANOTRON TECHNOLOGIES GMBH, Berlin (DE)

( * ) Notice: Subject to any disclaimer, the term of this patent is extended or adjusted under 35 U.S.C. 154(b) by 920 days.

(21) Appl. No.: 13/472,878

(22) Filed: May 16, 2012

(65) Prior Publication Data

US 2013/0021206 A1  Jan. 24, 2013

(30) Foreign Application Priority Data

May 16, 2011 (EP) .................................. 11166284
Sep. 16, 2011 (EP) .................................. 11181681

(51) Int. Cl.
G01S 5/06 (2006.01)
G01S 5/00 (2006.01)
G01S 5/02 (2010.01)

(52) U.S. Cl.
CPC .............. *G01S 5/06* (2013.01); *G01S 5/0081* (2013.01); *G01S 5/021* (2013.01)

(58) Field of Classification Search
CPC ........... G01S 5/06; G01S 5/021; G01S 5/0081
See application file for complete search history.

(56) References Cited

U.S. PATENT DOCUMENTS 6,404,338 B1  6/2002 Koslar
6,968,194 B2  11/2005 Aljadeff et al.
(Continued)

FOREIGN PATENT DOCUMENTS

KR  2011 0019196 A  2/2011
WO  2009/078536 A1  6/2009

OTHER PUBLICATIONS

IEEE 802.15 4a; IEEE Standard for Information Technology—Telecommunications and Information Exchange Between System—Local and Metropolitan Area Networks—Specific Requirements; Part 15.4: Wireless Medium Access Control (MAC) and Physical Layer (PHY) Specification for Low-Rate Wireless Personal Area Networks; Amendment 1: Add Alternate PHYs; IEEE Computer Society; Aug. 31, 2007.
(Continued)

*Primary Examiner* — Cassie Galt
(74) *Attorney, Agent, or Firm* — Ware, Fressola, Maguire & Barber LLP

(57) ABSTRACT

A method for determining an instantaneous phase difference between time bases of at least two location anchors for a desired point in time (t), each of the location anchors having transmitting and receiving access to a joint broadcast transmission medium and a respective time base for measuring time, wherein a first of the location anchors broadcasts a first broadcast message at least twice; the first location anchor and at least a second of the location anchors receive the first broadcast messages; the second location anchor broadcasting a second broadcast message at least twice; and the second location anchor and at least the first location anchor receive the second broadcast messages. The location server calculates the instantaneous phase difference from a determined first and second clock model functions and from a time elapsed between a reference point in time and the desired point in time t.

19 Claims, 8 Drawing Sheets

(56) References Cited

U.S. PATENT DOCUMENTS

| | | |
|---|---|---|
| 7,492,316 B1 | 2/2009 | Ameti et al. |
| 7,528,776 B2 | 5/2009 | Montuno et al. |
| 7,843,379 B2 | 11/2010 | Menzer et al. |
| 7,855,682 B2 * | 12/2010 | Gould et al. ............... 342/387 |
| 8,249,049 B2 * | 8/2012 | Silverman et al. .......... 370/350 |
| 9,019,159 B2 | 4/2015 | van Puijenbroek et al. |
| 2004/0108954 A1 | 6/2004 | Richley et al. |
| 2008/0095131 A1 | 4/2008 | Aljadeff et al. |

OTHER PUBLICATIONS

Ji Li, et al; "Position Location of Mobile Terminal in Wireless MIMO Communication Systems"; Journal of Communications and Networks, vol. 9, No. 3; Sep. 2007; pp. 254-264.

Yingfei Diao, et al; "An Overview of Range Detection Techniques for Wireless Sensor Networks"; Proceedings of the 8th World Congress on Intelligent Control and Automation Jul. 6-9, 2010, Jinan, China; 2010 IEEE; pp. 1150-1155.

* cited by examiner

- Prior Art -

METHOD AND SYSTEM FOR MULTIPATH REDUCTION FOR WIRELESS SYNCHRONIZING AND/OR LOCATING

CROSS REFERENCE TO RELATED APPLICATIONS

This application claims priority under 35 USC § 119(e) to European Patent Application No. 11 166 284.7 filed on May 16, 2011 and European Patent Application No. 11 181 681.5 filed on Sep. 16, 2011, which applications are hereby incorporated by reference.

FIELD OF THE INVENTION

The present invention relates to the field of wireless synchronization, which can be used for instance in Real Time Locating Systems (RTLS) based on Time Difference Of Arrival (TDOA).

BACKGROUND OF THE INVENTION

In Real Time Locating Systems, which utilize a Time Difference Of Arrival of messages transmitted by location tags and received by location receivers, time base synchronization between location receivers is a key task.

In the context of the present specification, synchronization is to be understood as a determination of a synchronization correction value, which describes the difference between the time assessed in accordance with the different time bases of the location receivers at a given moment. Whether this information is subsequently used to actually adjust the time bases or to correct TDOA values which were generated using these time bases is irrelevant. The latter use of synchronization is sometimes called "virtual synchronization", for instance in U.S. Pat. No. 6,968,194 B2.

In many products synchronization is achieved by connecting the location receivers, which herein will also referred to as location anchors, with a reference time base over a wired connection. Obviously, however, a wired connection is expensive to install and in some cases may even be impossible to install.

Several methods have been developed in order to perform said synchronization via a wireless channel. Such methods use a reference device, which transmits a reference signal. For example, US 2004/0108954 A and U.S. Pat. No. 7,492,316 B1 describe the use of a "reference tag", which transmits a sequence of pulses as a reference signal, for distributing reference timing within a network of location receivers.

Another system described in U.S. Pat. No. 7,528,776 B2 makes use of the fact that the reference device is positioned at a known location.

Another prior-art Real Time Locating System that uses a wireless channel for synchronization is shown in FIG. 1. It comprises location receivers 100, reference devices 101, location tags 102 and a location server 104. The location receivers 100 are located at known positions. The reference devices 101, which will also be called reference tags herein, are also located at known positions. The location tags 102 are those devices, for which the current position shall be identified by the RTLS.

For synchronization purposes, the reference tags 101 periodically broadcast messages, which are received by the location receivers 100. Based on the respective Times Of Arrival (TOAs), time differences of arrival (TDOAs) between the respective times of reception of these messages by different location receivers 100 are calculated. Given the known positions of the reference tags, the synchronization between the location receivers 100 is calculated.

In order to determine the location of the location tags 102, the location tags 102 broadcast messages, which are received by at least some of the location receivers 100. The respective TOAs of these messages are recorded at the location receivers 100 and reported to the location server 104. The location server 104 calculates the TDOAs between location receivers. Based on the TDOAs and the known positions of the location receivers 100 the location server 104 determines the location of the location tags 102.

In practice, a message which is transmitted by the reference tag 101 and received by location receivers 100 is subject to multipath propagation. This multipath propagation causes an error in the synchronization of the location receivers 100. Thus, the synchronization between location receivers 100 and the subsequent calculations of TDOAs and locations of location tags may be highly inaccurate in a multipath environment.

US 2008/0095131 A1 addresses the problem of multipath propagation of reference messages by performing a distance measurement between a reference tag, (which is called "sync unit"), and the location receivers. Basically, two-way ranging measurements between location receivers and reference tags are suggested. Two way ranging has been described for example in annex D1.3.1 of IEEE 802.15.4a-2007. For this purpose, the location receivers are also capable of transmitting messages. Hence the location receivers of this system might actually be called location transceivers. A drawback of the approach disclosed in US 2008/0095131 A1 lies in the fact that the accuracy of the two-way ranging will strongly depend on the accuracy of the time bases of the location receivers involved. Furthermore, this approach puts additional hardware complexity and additional processing load on the location receivers by requiring the handling of the two-way ranging process, which consumes additional airtime and energy.

SUMMARY OF THE INVENTION

According a first aspect of the present invention, a method for determining an instantaneous phase difference $\hat{C}_{A_1 A_2}(t)$ between time bases of at least two location anchors A1, A2 at a desired point in time (t), each of the location anchors having transmitting and receiving access to a joint broadcast transmission medium and a respective time base for measuring time is provided. The method comprises in one embodiment a first of the location anchors broadcasting a first broadcast message at least twice, that is, at different times;

the first location anchor and at least a second of the location anchors receiving the first broadcast messages;

the second location anchor broadcasting a second broadcast message at least twice, that is, at different times;

the second location anchor and at least the first location anchor receiving the second broadcast messages;

the first and the second location anchors each generating time-of-arrival stamps, hereinafter TOA stamps, which are indicative of respective first and second times of reception of the first and second broadcast messages in terms of their respective time base, wherein the first and second location anchor not only generates TOA stamps for the broadcast messages received from the respective other of the first and second location anchors, but also TOA stamps for the broadcast messages received from the respective same location anchor itself;

the first and second location anchor providing the generated TOA stamps to a location server in a manner that allows the location server an identification of also the location anchor broadcasting the broadcast message subject to a respective TOA stamp, of the location anchor receiving the broadcast message subject to a respective TOA stamp, and of the broadcast message;

the location server calculating time-difference-of-arrival values, hereinafter TDOA values, from each pair of collected TOA stamps that pertains to the same first or second broadcast message;

the location server, using at least two of the calculated TDOA values pertaining to the broadcast messages broadcast by a respective one of the first and second location anchor, respectively, determining first and second set of parameters that define a first and a second clock model function of time, respectively, the first clock model function describing a time dependence of the TDOA values of the broadcast messages transmitted by the first location anchor only, and the second clock model function describing a time dependence of the TDOA values of the broadcast messages transmitted by the second location anchor only;

the location server calculating the instantaneous phase difference from the determined first and second clock model functions and from a time elapsed between a reference point in time and the desired point in time t.

The present invention discloses methods including a real-time locating method and a real-time locating system, which eliminate the need for using reference tags and which yields synchronization between location anchors free of multipath error even without requiring additional measurements. Instead of performing additional measurements, a time base difference free of multipath error is calculated based on pairs of measured TDOA values subject to multipath error. Thus, air time used for location anchor synchronization is minimized and the capacity of location tags in the system can be maximized.

The method of the first aspect of the invention allows determining an estimate of the instantaneous phase difference between the time bases of location anchors. This estimate is not affected by multipath error, and is also not affected by errors in determining the propagation time of the signal over the geometrical distance.

The method provides a basis for numerous advantageous embodiments, which, for instance determining a precise distance of a location tag from location anchors, or determining a precise position of a location tag, or other location-related information. Furthermore, the disclosed method is capable of generating detailed information on the multipath situation, in which the system is operated, by determining the value of a multipath error for the exchange between different or all possible pairs of location anchors.

Since the method works per location anchor pair, the disclosed invention can easily be applied to small systems which contain at least two anchors as well as to large and very large systems with in principle unlimited numbers of location anchors distributed over a wide spatial area.

A location anchor according to the present invention may be implemented in various forms and using one or more different technologies for communication of broadcast messages. In one embodiment, the location anchor is implemented in a fixed network node of a long-range radio access network operating in accordance with a wireless communication standard, such as, for instance, GSM, UMTS or LTE. As such, the location anchor may be implemented for example in the form of a base station or Node B. In another embodiment, the location anchor is implemented in a fixed network node of a local wireless network installation using for instance a short-range radio network communication technology standard such as Bluetooth, ZigBEE, Wireless LAN/Wi-Fi, or WPAN. "Fixed" means that the respective location anchor is not in motion with respect to the other location anchors involved in the processing of the method according to the present invention. In most application cases, the location anchors involved are installed at respective locations known to the location server and do not move at all during operation.

Different clock model functions may be of same function type, i.e., show the same type of dependence (linear, quadratic, etc.) on time t, but may be shifted along the vertical axis (ordinate) with respect to with each other. As such, they may also be referred to as different clock model function realizations of the same clock model function.

According to an embodiment of the method of the invention, the first and second clock model functions are linear functions. Calculating the instantaneous phase difference ($\hat{C}_{A_1A_2}(t)$) comprises in this embodiment determining first and second sets of parameters of the first and second clock model functions, a respective first parameter value corresponding to an offset of the respective linear function, and determining, for at least one of the first and second clock model functions, a respective second parameter value corresponding to a slope of the respective linear function.

In a further embodiment, at least three locations anchors, in respective pairwise associations, broadcast and receive broadcast messages, and provide their TOA stamps to the location server. The method of this embodiment further comprises determining respective instantaneous phase differences of the time bases of the different pairs of the location anchors, by performing the method according to any embodiment of the first aspect of the invention individually for the different location anchor pairs.

The time of reception to be included in a TOA stamp pertaining to a reception of a broadcast message sent by a subject location anchor itself may in one embodiment be determined by receiving the broadcast message via an antenna separate from an antenna used for transmitting the broadcast message.

In a further embodiment, the location anchor determines a time of transmission of the broadcast message, and the time of reception is estimated by the location anchor being equal to the time of transmission.

In a further embodiment, which may be used in combination with anyone of the preceding embodiments, the following steps are additionally performed:
at least one of the location anchors and the location server monitoring a physical quantity indicative of a predetermined characteristic of a transmission channel used for the broadcast messages;
the location server or the location anchors adapting a time schedule for broadcasting the broadcast messages in dependence on an instantaneous value of the physical quantity.

According a second aspect of the present invention, a method for determining a difference of distances of a location tag from at least two location anchors is provided, the location of the location tag being unknown and the respective locations of the location anchors being known to a location server. The method comprises:
the location tag broadcasting a tag message;
a first and a second of the location anchors receiving the tag message;

the first and second location anchors generating first and second tag message time-of-arrival stamps, herein after tag TOA stamps, which are indicative of a first and second time of reception of the tag message at the first and second location anchor, respectively, in terms of the time base of the first and second location anchor, respectively;

the first and second location anchors providing the generated respective tag TOA stamps to the location server;

the location server determining a TDOA value for the tag message from the first and second tag TOA stamps;

the location server determining an instantaneous phase difference between time bases of the first and second location anchors for a time at which the tag message was received by one of the location anchors;

the location server correcting the determined TDOA value by the determined instantaneous phase difference, thus obtaining a corrected TDOA value;

the location server determining a difference in distance of the location tag from the first and second location anchor, using the corrected TDOA value and a known speed of signal propagation within the broadcast medium;

wherein determining the instantaneous phase difference between the time bases of the first and second location anchors comprises performing a method according to any of the embodiments of the method of the first aspect of the invention.

According to a third aspect of the invention, a method for determining a location of a location tag in terms of an at least one-dimensional coordinate system comprises performing the method of the second aspect of the invention or any of its embodiments for at least two different pairs of location anchors formed by at least three location anchors, namely the first, the second and a at least a third location anchor;

the location server calculating differences in distance of the location tag from at least two different pairs formed by the first, second and third location anchors;

the location server determining the location of the location tag as the location that exhibits all calculated distance differences between the tag and the at least two different pairs formed by the first, second and third location anchors.

According to a fourth aspect of the invention, a method for operating a location server in determining an instantaneous phase difference between time bases of at least two location anchors at a desired point in time t, each location anchor having a respective time base for measuring time comprises:

the location server receiving, from a first and a second location anchor, pairs of TOA stamps, which are indicative of respective first and second times of reception of first and second messages in terms of their respective time base, wherein the location server receives from the first and second location anchor not only TOA stamps for messages broadcast from one and received by the respective other location anchor, but also TOA stamps for messages broadcast and received from the respective same location anchor itself;

the location server calculating time-difference-of-arrival values, hereinafter TDOA values, from each pair of collected TOA stamps that pertains to the same, i.e., either the first or the second message, respectively;

the location server, using at least two of the calculated TDOA values pertaining to the broadcast messages broadcast by a respective one of the first and second location anchor, respectively, determining first and second set of parameters that define a first and a second clock model function of time, respectively, the first clock model function describing a time dependence of the TDOA values of the broadcast messages transmitted by the first location anchor only, and the second clock model function describing a time dependence of the TDOA values of the broadcast messages transmitted by the second location anchor only;

the location server calculating the instantaneous phase difference from the determined first and second clock model functions and from a time elapsed between a reference point in time and the desired point in time t.

An embodiment of this method comprises the location server additionally determining the instantaneous phase differences between the time bases of the second location anchor and a third location anchor;

the location server calculating an instantaneous phase difference between the time bases of the first and the third location anchor only from the determined instantaneous phase differences between the time bases of the first and second location anchors and between the second and the third location anchors.

A further embodiment comprises the location server scheduling a time of transmission of the broadcast messages by the location anchors using a time schedule and triggering the location anchors in accordance with the time schedule.

According to another embodiment, the method of any of the previous embodiments of the present aspect of the invention further comprises the location server determining a message propagation time span using the known locations of the first and second location anchors and a known speed of signal propagation in the broadcast medium;

the location server determining a multipath error of the reception time at the desired point in time, using a difference between elements of the determined sets of parameters of the first and second clock model function and the message propagation time span.

According to a fifth aspect of the invention, a method for operating a location server in determining a difference of distances of a location tag from at least two location anchors, the location of the location tag being unknown and the respective locations of the location anchors being known to a location server. The method comprises the location server receiving, from the first and second location anchors, tag TOA stamps, which are indicative of a first and second time of reception of the tag message broadcast by the location tag at the first and second location anchor, respectively, in terms of the time base of the first and second location anchor, respectively;

the location server determining a TDOA value for the tag message from the first and second TOA stamps;

the location server determining an instantaneous phase difference between time bases of the first and second location anchors for the time at which the tag message is received by one of the location anchors the location server correcting the determined TDOA value by the determined instantaneous phase difference, thus obtaining a corrected TDOA value;

the location server determining a difference in distance of the location tag from the first and second location anchor, using the corrected TDOA value and a known speed of signal propagation within the broadcast medium;

wherein determining the instantaneous phase difference between the time bases of the first and second location anchors comprises performing a method according to one of embodiments 7 to 10.

According to a sixth aspect of the invention, a method for operating a location anchor in determining an instantaneous phase difference between time bases of at least two location anchors at a desired point in time (t), each of the location anchors having transmitting and receiving access to a joint broadcast transmission medium and a respective time base for measuring time. The method comprises:

broadcasting a first broadcast message at least twice, that is, at different times;

receiving the first broadcast messages;

receiving second broadcast messages from a second location anchor at least twice, that is, at different times;

generating time-of-arrival stamps, hereinafter TOA stamps, which are indicative of respective first and second times of reception of the first and second broadcast messages in terms of the time base of the location anchor, wherein location anchor not only generates TOA stamps for the broadcast messages received from a respective other location anchor, but also TOA stamps for the broadcast messages received from the subject location anchor itself;

providing the generated TOA stamps to a location server in a manner that allows the location server an identification of also the location anchor broadcasting the broadcast message subject to a respective TOA stamp, of the location anchor receiving the broadcast message subject to a respective TOA stamp, and of the broadcast message.

In one embodiment, this method further comprises the location anchor scheduling respective times of transmission of the first or second broadcast messages at an individual time schedule, in particular a random time schedule.

A seventh aspect of the present invention is formed by a location server. The location server comprises:

a receiving part configured to receive, from a first and a second location anchor, pairs of TOA stamps, which are indicative of respective first and second times of reception of first and second messages in terms of their respective time base, that is, not only TOA stamps for messages broadcast from one and received by the respective other location anchor, but also TOA stamps for messages broadcast and received from the respective same location anchor itself;

a TDOA unit configured to calculate time-difference-of-arrival values, hereinafter TDOA values, from each pair of collected TOA stamps that pertains to the same, i.e., either the first or the second message, respectively;

a parameter estimation unit, which is configured to determine, using at least two of the calculated TDOA values pertaining to the messages transmitted by a respective one of the first and second location anchor, respectively, first and second sets of parameters that define a first and a second clock model function, respectively, the first clock model function describing a time dependence of the TDOA values of the messages broadcast by the first location anchor only, and the second clock model function describing a time dependence of the TDOA values of the messages broadcast by the second location anchor only;

a phase-difference determination unit, which is configured to calculate the instantaneous phase difference from either some or all elements of the determined sets of parameters of the first and second clock model functions, and from a time elapsed between a reference point in time and the desired point in time t.

In one embodiment, the location server is configured to determine a difference of distances of a location tag from at least two location anchors, the location of the location tag being unknown and the respective locations of the location anchors being known to a location server, wherein the receiving part is configured to receive, from the first and second location anchors, tag TOA stamps, which are indicative of a first and second time of reception of the tag message broadcast by the location tag at the first and second location anchor, respectively, in terms of the time base of the first and second location anchor, respectively;

the phase-difference determination unit is configured to determine instantaneous phase difference between time bases of the first and second location anchors for the time at which the tag message is has been received by one of the anchors;

the TDOA unit is configured to determine a TDOA value for the tag message from the first and second TOA stamps and to correct the determined TDOA value by the determined instantaneous phase difference, thus obtaining a corrected TDOA value;

a locating unit comprised by the location server is configured to determine a difference in distance of the location tag from the first and second location anchor, using the corrected TDOA value and a known speed of signal propagation within a broadcast medium used by the first and second location anchors and by the location tag.

An embodiment of the location server further comprises a multipath estimation unit, which is configured to calculate a message propagation time span using the known locations of the first and second location anchors and a known speed of signal propagation in the broadcast medium;

calculate a multipath error of the reception time, using only a difference between elements of the determined sets of parameters of the first and second clock model functions, and using the message propagation time span. According to an eighth aspect of the invention, a location anchor is provided. The location anchor comprises a transmitting and receiving part, which is configured to have transmitting and receiving access to a joint broadcast transmission medium shared with other location anchors, a time base for measuring time; wherein the transmitting and receiving part is additionally configured to broadcast a first broadcast message at least twice, that is, at different times, and to receive the first broadcast messages; and to receive second broadcast messages from a second location anchor at least twice, that is, at different times;

a TOA unit, which is configured to generate time-of-arrival stamps, hereinafter TOA stamps, which are indicative of respective first and second times of reception of the first and second broadcast messages in terms of the time base of the location anchor, wherein TOA unit is not only to configured to generate TOA stamps for the second broadcast messages received from a respective other location anchor, but also TOA stamps for the first broadcast messages received from the claimed location anchor itself;

wherein the location anchor is additionally configured to provide the generated TOA stamps at an interface for communicating with a location server in a manner that allows the location server an identification of also the location anchor broadcasting the broadcast message subject to the respective TOA stamp, of the location anchor receiving the broadcast message subject to the respective TOA stamp, and of the broadcast message subject to the respective TOA stamp.

Further aspects of the present invention are related to computer program products, performing the steps of the method of one of the embodiments of the method of the fourth aspect of the invention, when said product is run on a computer.

Yet further aspects of the present invention are related to computer program products, performing the steps of the method of one of the embodiments of the fifth aspect of the invention, when said product is run on a computer.

In the following, further embodiments of the various aspects of the present invention are described. It is noted that the additional features of different embodiments may be combined with each other to form further embodiments, unless these additional features are mutually exclusive and can only be used in alternative embodiments.

The calculation of the instantaneous phase difference based on the determined parameters of the first and second clock model function realizations can be performed in different ways.

In one form by the location server calculating an estimate of an initial offset difference of the time bases of the first and second location anchors at a reference point in time from only the determined offset parameters of the first and second clock model function; and by the location server calculating an instantaneous phase difference from the estimated initial offset difference of the time bases of the first and second location anchors, from at least one of the determined slope parameters of the first and second clock model function realizations, and from a time elapsed between the reference point in time and the desired point in time t.

The multipath error may be determined by the location error in the following way: the location server determining a multipath error of the reception time at the desired point in time, by using the determined offset and slope parameters of the first and second clock model function realizations to determine a difference at the desired point in time between the second and the first estimated TDOA value, the first estimated TDOA value pertaining to the first clock model function realization and the second estimated TDOA value pertaining to the second clock model function realizations, by multiplying the difference by 0.5, and by subtracting the determined message propagation time span.

A location anchor may at the same time function as a location server.

An arrangement employing at least one of the various aspects of the present invention may comprise an arbitrary number of location anchors.

In an arrangement comprising a larger number of location anchors, such as, by way of example only, more than 3, or more than 10, or more than 20, more than 100, or more than 1000, the pairwise synchronization of the location anchors for a time t, in other words, determining an instantaneous phase difference ($\hat{C}_{A_1A_2}(t)$) between time bases two location anchors for a desired point in time t, is performed in a predetermined or random order. As an example for a pre-determined order, a rotational order may be used. This includes for instance performing the repeated exchange of broadcast messages between pairs of location anchors in the predetermined order and subsequently repeating the exchange in the same order, while the location server continuously determines the instantaneous phase differences between the different pairs of location anchors. This repeated process may be performed continuously during operation of the arrangement.

In another embodiment, a multipath delay between a pair of location anchors determined by using an embodiment of the present invention is used to correct a determined TDOA pertaining to the reception of a tag message at different ones of the location anchors. To this end, for each of the TOA stamps received, the location server uses the determined multipath error of a location anchor pair that contains the location anchor receiving the tag message and a location anchor that is arranged near a last determined position of the location tag.

The aspects and embodiments of the present invention may use any physical transmission medium for implementing a broadcast channel. For instance, a broadcast message may be sent by means of sound waves, ultrasound waves, electromagnetic waves, radio frequency electromagnetic waves, the radio frequency being for instance 2.4 GHz, ultra wideband electromagnetic waves, light waves.

DETAILED DESCRIPTION OF EMBODIMENTS

Figure 1:
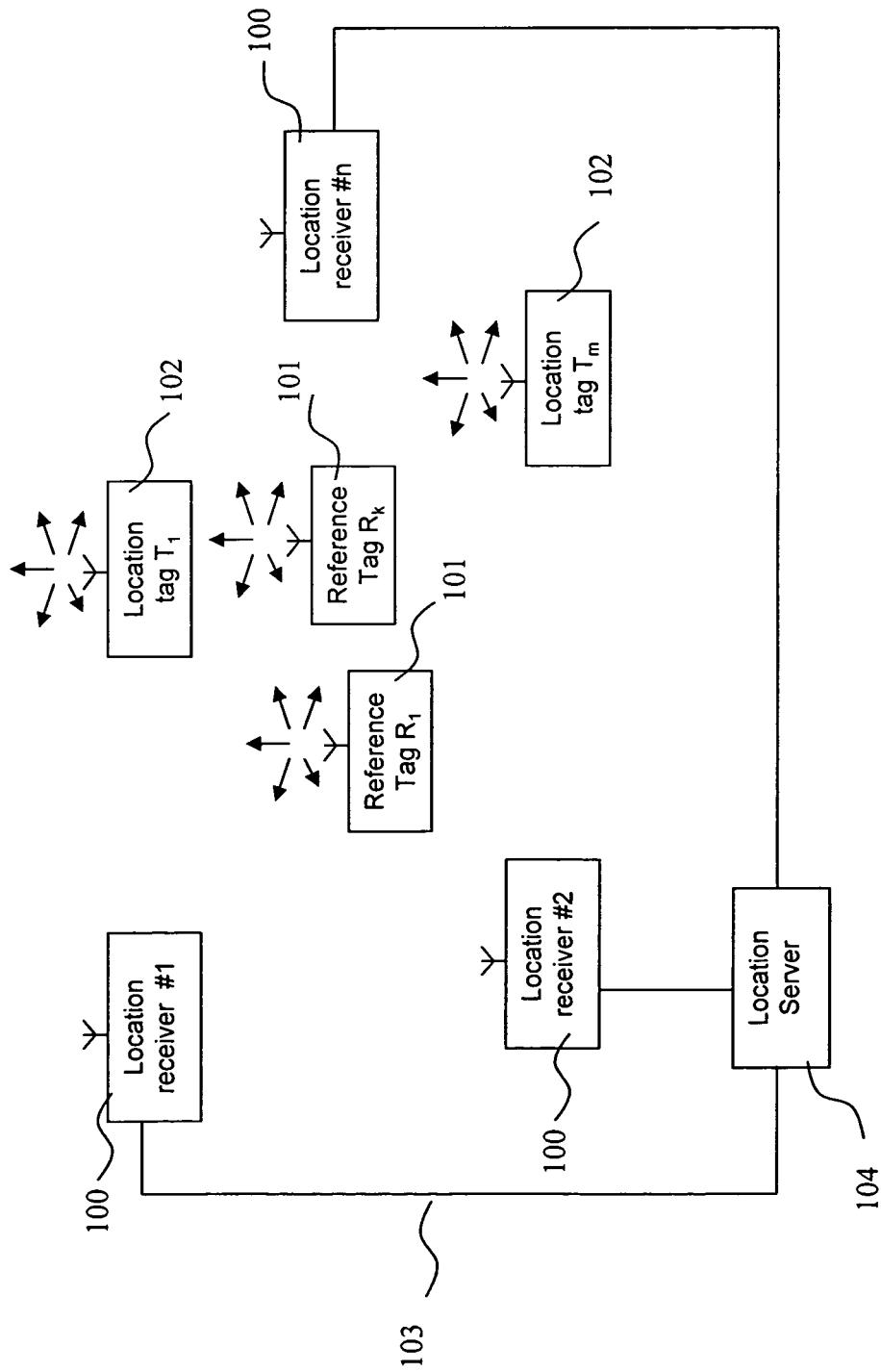
FIG. 1 shows a typical state of the art Real Time Locating System
Figure 2:
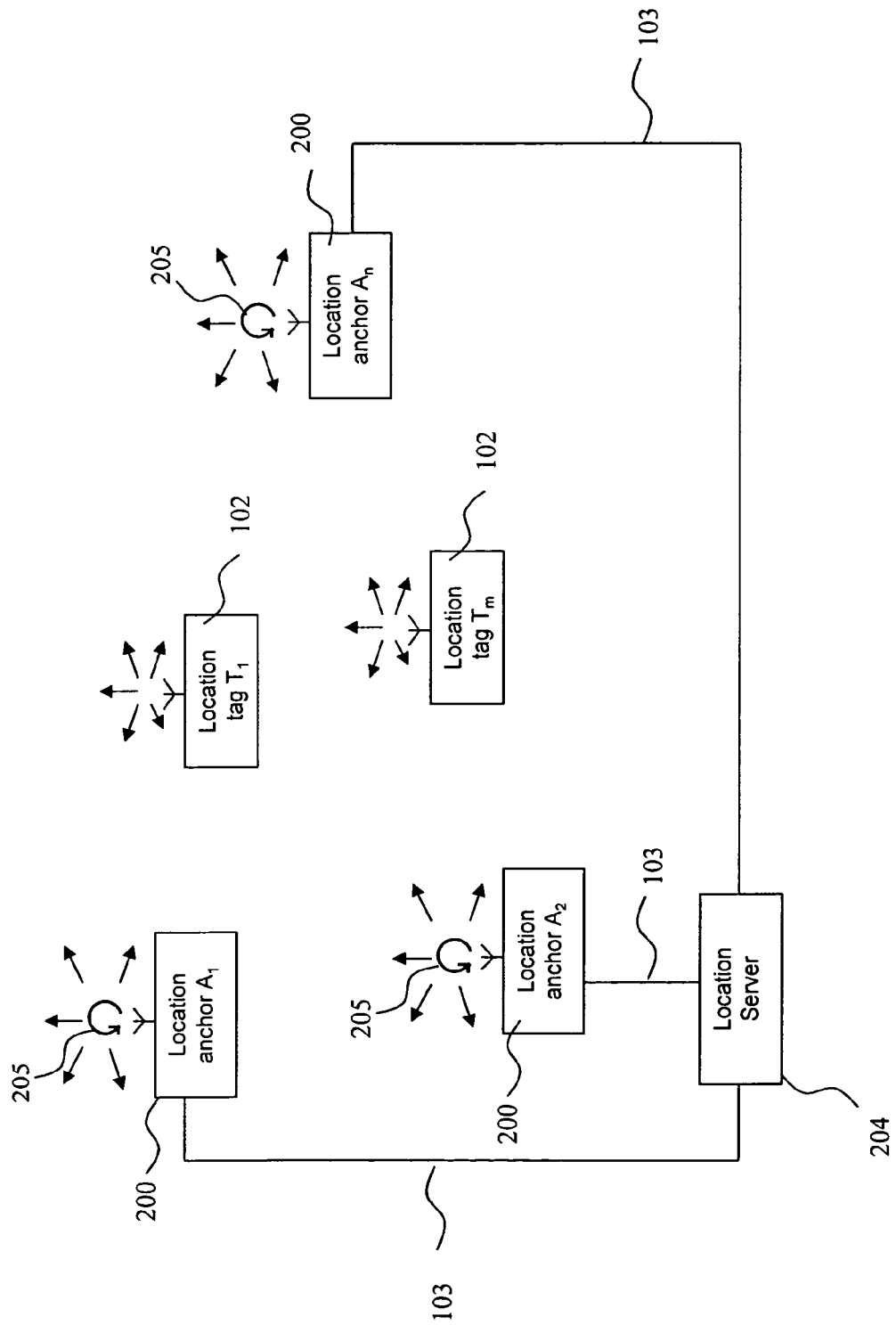
FIG. 2 shows a general embodiment of the invention

A first embodiment of the invention is depicted in FIG. 2. For the purpose of clarity, those location receivers, which have wireless receivers and which are located at known positions will be called location anchors in the following and share the reference label 200. The location anchors 200 are each connected with at least one location server 204 through some communication channel 103, which may be wired or wireless, the latter including, but not being limited to a radio communication, infrared or acoustic communication channel.

The location anchors 200 are capable of wirelessly transmitting signals. Each or at least some of the location anchors 200 are also capable of receiving wirelessly transmitted signals or messages from other location anchors 200, and they are capable of receiving wirelessly transmitted signals or messages from location tags 102, the position of which is initially unknown and which are thus to be located.

Furthermore the location anchors 200 are capable of transmitting messages. However, this capability is used completely different from prior-art systems described in the introductory part of the present specification as background art.

The location anchors 200 generate time of arrival stamps (TOAs) for messages they receive, and they also generate additional TOAs for messages they transmit. This is indicated by a self reception arrow 205. It is important to note that those additional TOAs have little or no multipath error, because the transmission path from the transmission antenna to the reception antenna (which may even be implemented by only one antenna) is not subject to significant multipath effects.

Each location anchor 200 is equipped with some kind of time base. Typically a crystal oscillator is used.

In order to fully and precisely describe the invention, a time base model will be defined in the following. The commonly used, simple model which describes a time base based on two parameters, start offset and frequency error, is sufficient here. Of course, a time base model of higher complexity would result in more complex calculations, but would in the end yield similar or same results in the context of the present invention.

We define:

$$C_{A_n}(t)=T_{A_n}^{\,o}+(1+e_{A_n})t, n=\{1,2,\ldots,N\} \quad (1)$$

where t is the true reference time;

$C_{A_n}(t)$ is the instantaneous phase of the time base of location anchor An at time t;

In other words, the instantaneous phase of the time base of a location anchor is a time value that the time base of the location anchor provides at a given time value of the true reference time.

$T_{A_n}^{\,o}$ the initial offset of the time base of location anchor An and can be interpreted as random start value at t=0; and $e_{A_n}$ is the frequency error of time base of location anchor An.

Typically the absolute value of the frequency error is below a known limit, e.g., a tolerance of a crystal. Due to changes in temperature, supply voltage etc. it will vary randomly but slowly.

Figure 3:
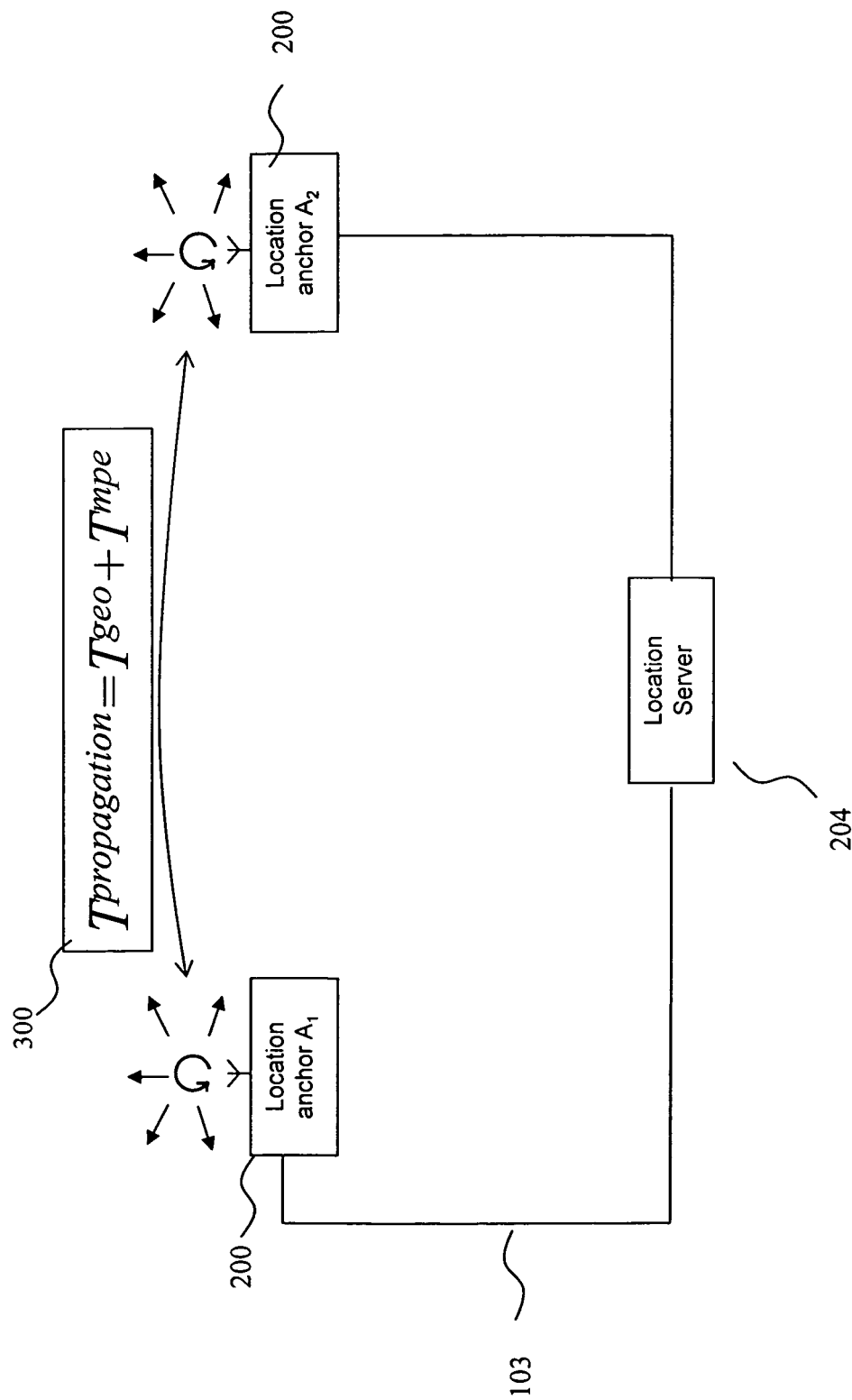
FIG. 3 shows the minimal embodiment of the invention with two anchors

Although the number of location anchors usable by the invention is not limited, for explanatory purposes the calculation involved will be derived for a minimum embodiment with two location anchors A1 and A2 as depicted in FIG. 3. As indicated in FIG. 3, the propagation time, $T^{propagation}$ 300, of a message which travels form location anchor Al to location anchor A2 or vice versa consists of two components, which are the duration $T^{geo}$ which results from the geometric distance between location anchors A1 and A2 and the error $T^{mpe}$ which is caused by multipath propagation.

With (1) and $$T_{A_1A_2}^{\,o}=T_{A_1}^{\,o}-T_{A_2}^{\,o}$$

$$e_{A_1A_2}=e_{A_1}-e_{A_2} \quad (2)$$

where $T_{A_1A_2}^{\,o}$ is the initial offset difference between the time bases of location anchors A1 and A2, and $e_{A_1A_2}$ is the frequency-error difference between the time bases of location anchors A1 and A2, the instantaneous phase difference between the time bases of the two location anchors at time t can be expressed as $$C_{A_1A_2}(t)=C_{A_1}(t)-C_{A_2}(t)=T_{A_1}^{\,o}-T_{A_2}^{\,o}+(e_{A_1}-e_{A_2})\cdot t=T_{A_1A_2}^{\,o}+e_{A_1A_2}\cdot t \quad (3)$$

Every once in a while each location anchor wirelessly transmits a message which can be received by one or more location anchors. It is irrelevant how the transmission is triggered (random, deterministic, synchronized or other). Each of the N location anchors, which receive the message, generates a TOA stamp, with respect to its individual time base.

It is important to note that the transmitting location anchor also generates a TOA stamp for the message transmitted by this very location anchor itself. Several possibilities for generating this special TOA stamp exist. For example, this TOA stamp can be derived from the time of transmission. As an alternative, it can be generated by a receiver, to which the propagation delay and multipath delay are either zero, for instance because it is co-located with the transmitting part of the location anchor, or to which the propagation delay and multipath delay are exactly known. The receiver must be active during transmission of the message.

It is assumed in the following, that location anchor A1 has transmitted a broadcast message at t=t1 and that it has generated the TOA stamp $TOA_{A_1,A_1,t=t_1}$, while location anchor A2 has generated the TOA stamp $TOA_{A_1,A_2,t=t_1}$ upon reception of the broadcast message transmitted by location anchor A1. In the notation used here for the TOA stamps, the first index indicates the source location anchor, from which the message originates, while the second index indicates the receiving location anchor. The third index indicates the true time at which the transmitting location anchor would have received the message. Similarly, for the broadcast message transmitted by the second location anchor A2, the first location anchor A1 generates a TOA stamp $TOA_{A_1,A_2,t=t_2}$, and the transmitting second location anchor generates a time stamp $TOA_{A_2,A_2,t=t_2}$. Thus, for example, after each of the two location anchors A1, A2 has sent one broadcast message, four TOA stamps have been generated, two at the first location anchor A1, and two at the second location anchor A2. After each of the two location A1, A2 has sent two broadcast message, eight TOA stamps have been generated, four at the first location anchor A1, and four at the second location anchor A2. For reasons of clarity and conciseness of the present specification, the symbols used for the time stamps do not explicitly show an additional index that would refer to an order number per anchor of a respective broadcast message, that is, whether the time stamp refers to the first, second, third, etc. broadcast message transmitted by the respective location anchor. This additional index would not provide any additional help in explaining the principle discussed in the present context.

Without loss of generality and only for reasons of clarity, we can assume that the time base of anchor A1 is absolutely correct, which means that the location anchor A1 has the 'true' time. Hence we can write:

$$T_{A_1}^{\,o}=0$$

$$e_{A_1}=0 \quad (4)$$

Using (1) and (4) we get for a transmission of a message from location anchor A1 at t=t1 for the TOA stamp at location anchor A1:

$$TOA_{A_1,A_1,t=t_1}=t_1 \quad (5)$$

Using (1), (2) and (4) we get for a transmission of the same message from location anchor A1 at t=t1 for the TOA stamp at location anchor A2:

$$TOA_{A_1,A_2,t=t_1}=-T_{A_1A_2}^{\,o}+t_1-e_{A_1A_2}\cdot t_1+T_{A_1A_2}^{geo}+T_{A_1A_2}^{mpe} \quad (6)$$

wherein $T_{A_1A_2}^{geo}$ is the propagation time caused only by a (nearest) geometrical distance between location anchor A1 and location anchor A2; and $T_{A_1A_2}^{mpe}$ is the multipath delay encountered by a signal, which travels from location anchor A1 to location anchor A2.

For most wireless media it is reasonable to assume reciprocal propagation of signals. Thus we can write:

$$T_{A_2A_1}^{geo} = T_{A_1A_2}^{geo}$$

$$T_{A_2A_1}^{mpe} = T_{A_1A_2}^{mpe} \quad (7)$$

Using (5), (6) and (7) the Time Difference Of Arrival between location anchors A1 and A2 for the message transmitted by the location anchor A1 at time $t_1$ can be calculated as follows:

$$TDOA_{A_1,A_1,A,t=t_1} = TOA_{A_1,A_1,t=t_1} - TOA_{A_1,A_2,t=t_1} \quad (8)$$

This yields $$TDOA_{A_1,A_1,A_2,t=t_1} = T_{A_1A_2}^{0} - T_{A_1A_2}^{geo} - T_{A_1A_2}^{mpe} + e_{A_1A_2} \cdot t_1 \quad (9)$$

It should be noted that, since the terms $T_{A_1A_2}^{0}$, $e_{A_1A_2}$, $T_{A_1A_2}^{geo}$ and $T_{A_1A_2}^{mpe}$ are each constant or varying slowly, equation (9) can be approximated as a straight line with offset $K_{A_1A_2}$ and slope $e_{A_1A_2}$ and the variable t, which straight line is sampled at $t=t_1$. This can be represented as follows $$TDOA_{A_1,A_1,A_2,t} = k_{A_1A_1A_2} + s_{A_1A_1A_2} \cdot t \quad (10)$$

This means that from at least two measurements of $TDOA_{A_1,A_1,A_2,t}$ at different times, say for example $TDOA_{A_1,A_1,A_2,t_1}$ $TDOA_{A_1,A_1,A_2,t_3}$, estimates of the parameters $k_{A_1A_1A_2}$ (offset) and $s_{A_1A_1A_2}$ (slope) can be obtained by common techniques of parameter estimation, e.g., least square fitting, Kalman-filtering etc., which are well known to a person of ordinary skill in the art. The estimates are related as follows to physical quantities involved:

$$\hat{k}_{A_1A_1A_2} \approx k_{A_1A_1A_2} = T_{A_1A_2}^{0} - T_{A_1A_2}^{geo} - T_{A_1A_2}^{mpe}$$

$$\hat{s}_{A_1A_1A_2} \approx s_{A_aA_1A_2} = e_{A_1A_2} \quad (11)$$

The symbol "^" is used here for indicating that the respective value is an estimate. In other words, the estimate $\hat{k}_{A_1A_1A_2}$ is related to the initial offset difference $T_{A_1A_2}^{0}$ between the time bases of the location anchors A1 and A2, to the propagation time based on geometrical distance only, and to the multipath delay encountered by the signal, which travels from location anchor A1 to location anchor A2.

Similarly as above, for the transmission of the broadcast message from location anchor A2 at $t=t_2$:

$$TOA_{A_2,A_1,t=t_2} = t_2 + T_{A_1A_2}^{geo} + T_{A_1A_2}^{mpe}$$

$$TOA_{A_2,A_2,t=t_2} = -T_{A_1A_2}^{0} + t_2 - e_{A_1A_2} \cdot t_2 \quad (12)$$

and the corresponding TDOA for the message transmitted by the location anchor A2 at the time $t_2$ is:

$$TDOA_{A_2,A_1,A_2,t=t_2} = T_{A_1A_2}^{geo} + T_{A_1A_2}^{mpe} + e_{A_1A_2} \cdot t_2 \quad (13)$$

Estimating the parameters yields $$\hat{k}_{A_2A_1A_2} \approx k_{A_2A_1A_2} = T_{A_aA_2}^{0} + T_{A_1A_2}^{geo} + T_{A_1A_2}^{mpe}$$

$$\hat{s}_{A_2A_1A_2} \approx s_{A_2A_1A_2} = e_{A_1A_2} \quad (14)$$

Since $T_{A_1A_2}^{mpe}$ appear with opposite signs in equations (11) and (14) it is now possible to determine an estimate for the unknown $T_{A_aA_2}^{0}$ using equation (15)

$$\hat{T}_{A_1A_2}^{0} = \frac{1}{2}(\hat{k}_{A_2A_1A_2} + \hat{k}_{A_1A_1A_2}) \quad (15)$$

Equation (15) yields an estimate for the initial offset between the time bases of the two location anchors A1 and A2. It is to be pointed out that the estimate is not affected by multipath error $T_{A_1A_2}^{mpe}$, and is not even affected by the propagation time $T_{A_1A_2}^{geo}$ of the signal over the geometrical distance.

If $T_{A_1A_2}^{geo}$ is given, e.g., from the known locations of the location anchors A1 and A2, $T_{A_1A_2}^{mpe}$ can be estimated from equations (11) and (14) as $$\hat{T}_{A_1A_2}^{mpe} = \frac{1}{2}(\hat{k}_{A_2A_1A_2} - \hat{k}_{A_1A_1A_2}) - T_{A_1A_2}^{geo} \quad (16)$$

Regarding the slope of the lines it is possible to utilize the fact that both lines should have the same slope and thus two independent estimates for one parameter are available and can for example be averaged in order to further reduce the estimation error as indicated in equation (17)

$$\hat{e}_{A_1A_2} = \frac{1}{2}(\hat{s}_{A_2A_1A_2} + \hat{s}_{A_1A_1A_2}) \quad (17)$$

With the estimates obtained up to equation (15) it is now possible to calculate an estimate for the instantaneous phase difference between the time bases of the two location anchors A1 and A2 at any time t. For example either equation (18) or (19) could be used $$\hat{C}_{A_1A_2}(t)\hat{T}_{A_1A_2}^{0} + \hat{s}_{A_aA_1A_2} \cdot t \quad (18)$$

$$\hat{C}_{A_aA_2}(t) = \hat{T}_{A_1A_2}^{0} + \hat{s}_{A_2A_1A_2} \cdot t \quad (19)$$

A potentially even better estimate is obtained when the result from equation (17) is used. This yields equation (20):

$$\hat{C}_{A_1A_2}(t) = \hat{T}_{A_1A_2}^{0} + \hat{e}_{A_1A_2} \cdot t \quad (20)$$

Of course the same result would be obtained if the values at time t of the functions defined in equations (9) and (13) were estimated first and then averaged. This shown in equation (21)

$$\hat{C}_{A_1A_2}(t) = \frac{1}{2}(\hat{k}_{A_2A_1A_2} + \hat{s}_{A_2A_1A_2} \cdot t) + (\hat{k}_{A_1A_1A_2} + \hat{s}_{A_1A_1A_2} \cdot t) \quad (21)$$

It should be emphasized that the above equations, which were derived for one location anchor pair, can be applied to any location anchor pair in which the location anchors receive messages from each other in a system with an arbitrary number N of location anchors. Thus, information on time-base differences and multipath error between many or all location-anchor pairs is available.

In the use case of a real-time locating system additionally comprising a location tag, wherein the location of the location tag is unknown and the respective positions of the first and second location anchors are known to a location server, if a message from a location tag is received by a location anchor pair at time t—wherein any of the location anchors may serve as a time reference for t, irrespective of its correctness in terms of true time, because what matters in the present context is only the difference in respective times of the respective time bases of the location anchors—, the multipath-error free synchronization correction value between the two location anchors can be estimated and subtracted from the TDOA measured for the location tag. This yields a TDOA estimate or, after multiplying with the propagation speed, distance difference for the location tag with none or minimum synchronization error. For further processing of the TDOA values of location tags and/or for improvement of the location estimate of location tags the multipath information from equation (16) will be useful.

Figure 4:
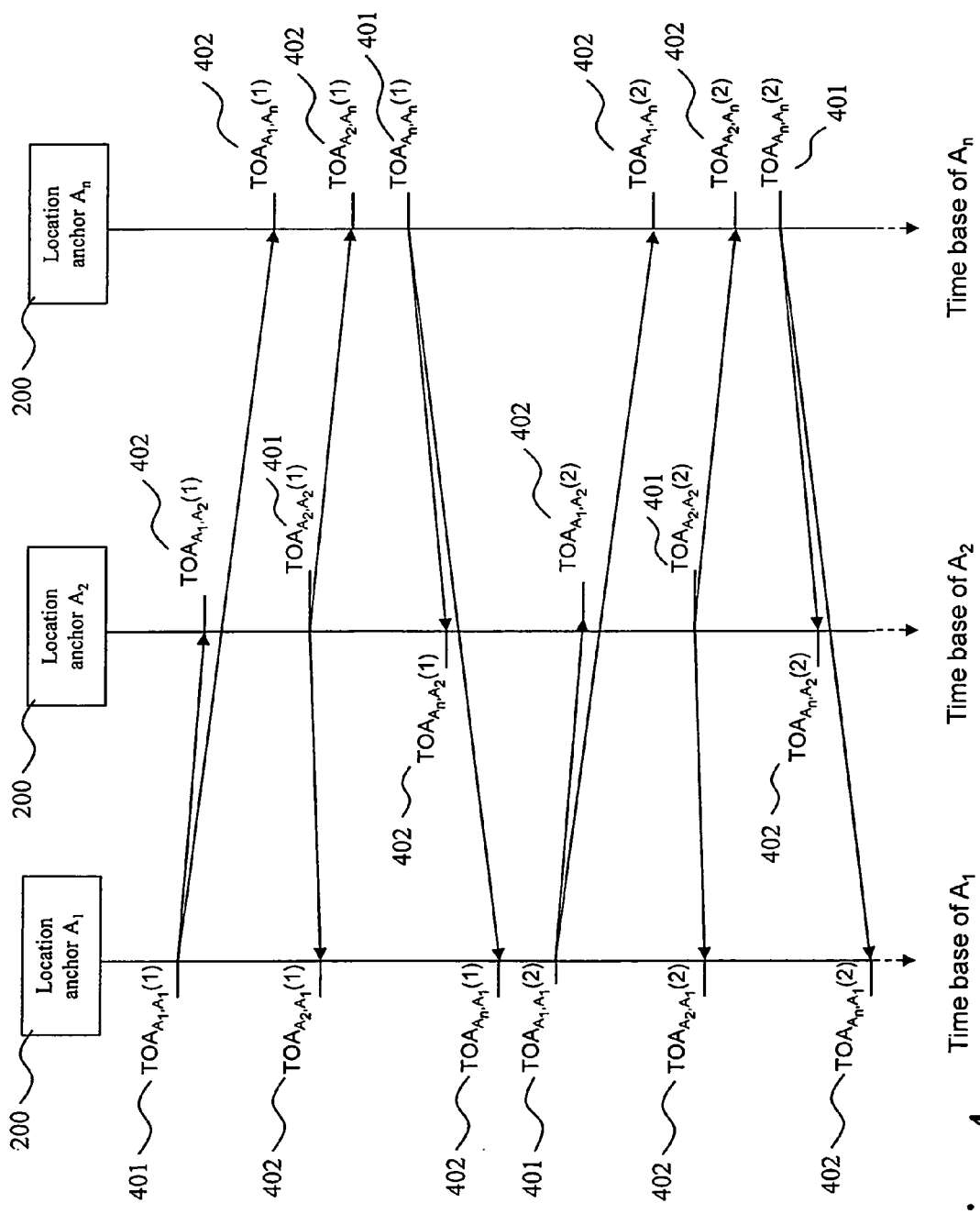
FIG. 4 shows the generation of timestamps of location anchors when transmitting and receiving messages

Detailed Description of FIG. 4

FIG. 4 depicts the generation of TOA stamps of the location anchors 200.

From time to time each location anchor 200 transmits a message, which is received by other (not necessarily all) location anchors 200. The timing for transmitting may be independent or coordinated between the location anchors. Location anchors 200 generate a TOA stamp 402 for each message which they receive. For messages which they transmit they also generate TOA stamps 401 which match the TOA stamp they would have generated if they had received the message over their reception antenna without any or with negligible multipath delay.

After two location anchors have received at least two messages from each other and the respective TOA stamps have been gathered in one place, typically the location server, the method disclosed in this invention can be applied. Further messages can be processed similarly in order to update and improve results.

Location anchors typically report the TOA stamps (TOAs) they generate to the location server together with information on the originating source of the message and other information like message ids. In the example here messages send out from a location anchor are enumerated with a counter which is given in brackets in order to identify a TOA stamp. E.g. $TOA_{A_n,A_1}(2)$ denotes the time of arrival at location anchor A1 of the second message sent by location anchor An.

Figure 5:
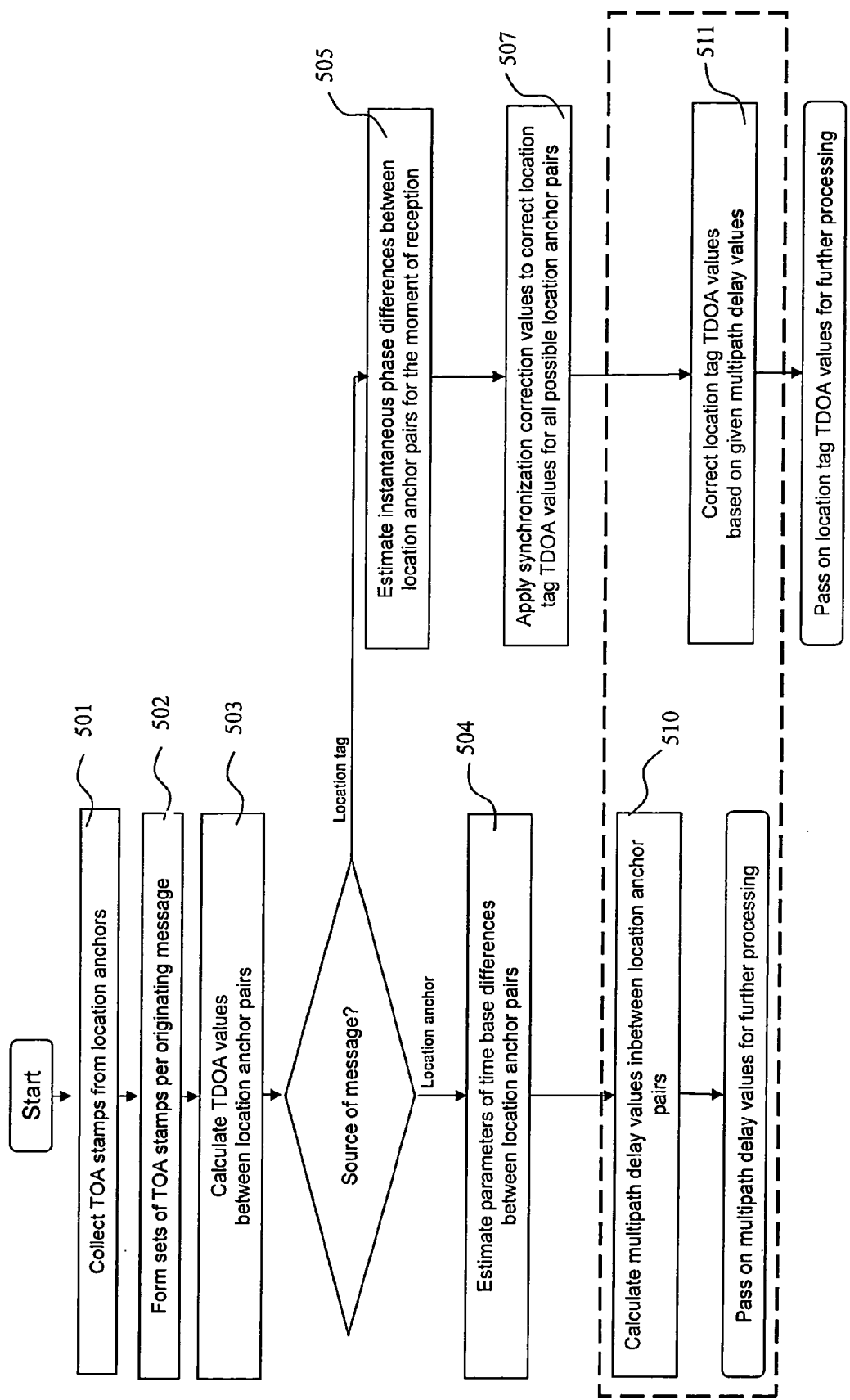
FIG. 5 shows the processing of timestamps at the location server

Detailed Description of FIG. 5

FIG. 5 depicts the processing of TOAs in the location server. At first TOAs reported by location anchors are collected 501 and TOAs which are related to the same message are grouped together 502. This grouping may be based on the time context of the incoming TOAs or on other information like the originating source, some message content like for example a message identifier or counter or on a combination of such.

In the next step some or all possible TDOAs in-between location anchor pairs are calculated from the TOAs 503.

Further processing depends on the type of source of the originating message for which the TOAs were generated.

If the message for which the TOAs have been generated, was transmitted by a location anchor, the resulting TDOAs are used for estimating the parameters of time base differences in-between the location anchor pairs like indicated in equations (11) and (14). At this point these parameter estimates are still subject to multipath error 504. Such estimation can be achieved by state of the art techniques like Kalman filtering or others. It is also possible to collect time series of TDOAs for location anchor pairs and update the estimation once in a while using all or some of the collected TDOAs.

If on the other hand the message was transmitted by a location tag, the instantaneous multipath error free phase differences for some or all location anchor pairs are calculated 505 using the method indicated by equation (18) or (19) or (20) or (21).

By applying (e.g. subtracting) the synchronisation correction values from the TDOAs of the location tag obtained in 503 synchronization error free TDOA values for the location tag are obtained 507.

In an enhanced embodiment further steps are taken:

Using the estimates obtained in 504 and applying equation (16) the multipath errors in-between anchor pairs are explicitly found 510. The multipath information found in 510 can either be passed up or it can be used immediately. Since the TDOA values of the location tags are still subject to multipath error between location tag and location anchors, there is a potential to reduce this multipath error. For example by utilizing the statistical correlation of multipath errors between different locations in one environment the TDOA values of the location tags can be reduced by a certain amount based on the multipath error determined between location anchors 511.

Figure 6:
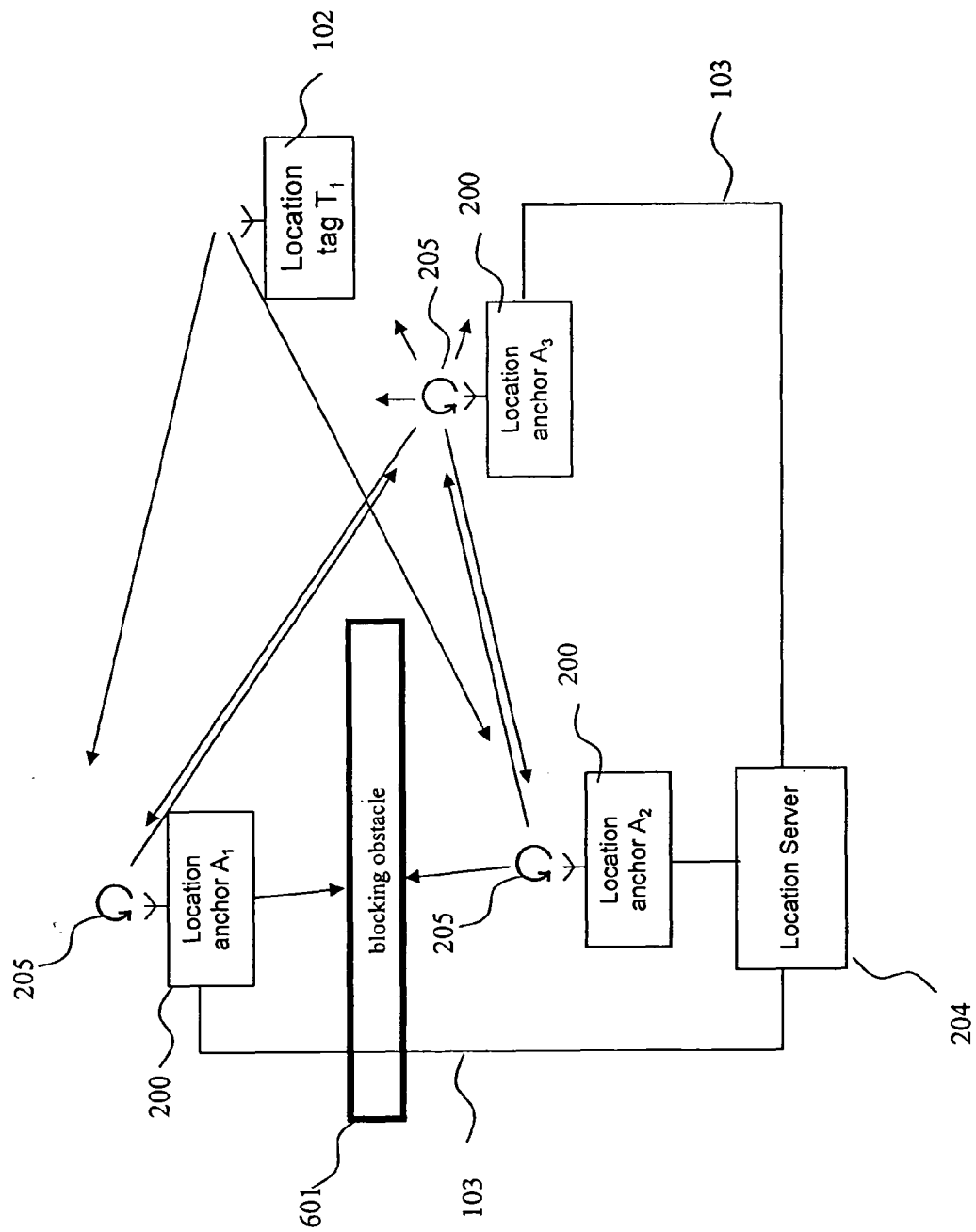
FIG. 6 shows a situation with blocked direct connection between two location anchors

Detailed Description of FIG. 6

As indicated in FIG. 6 the benefit of the disclosed invention even carries in situations in which there is no direct wireless connection in between a location anchor pair. Due to their spacing and the existence of a blocking obstacle 601 location anchor A1 does not receive messages from A2 and vice versa. Thus the parameter sets from 504 are not available for location anchor pair A1, A2. However they are available for location anchor pairs A1, A3 and A2, A3. If location anchor pair A1, A2 receives a message from a tag T1 the synchronization correction value for this location anchor pair is calculated out of the synchronization correction values for location pairs A1, A3 and A2, A3.

Figure 7:
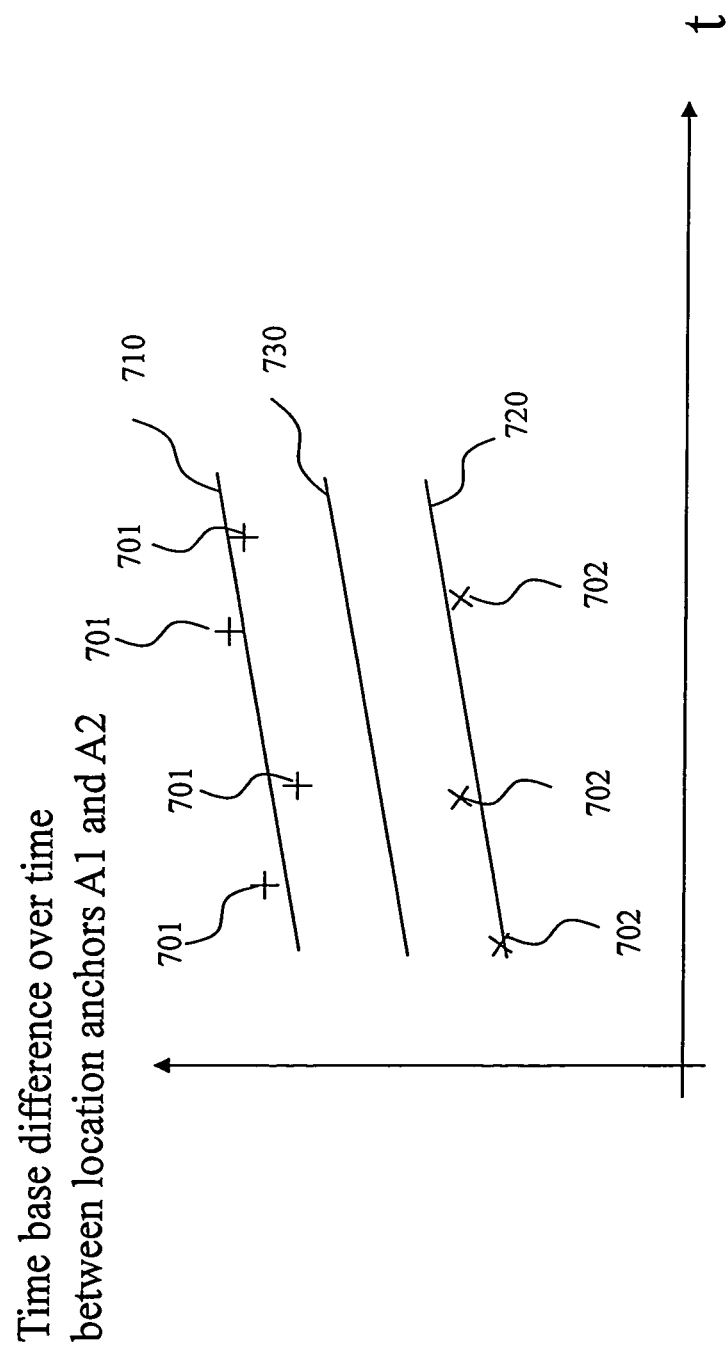
FIG. 7 shows a time diagram for TDOAs between two location anchors when one location anchor is also the originator of the message

Detailed Description of FIG. 7

As has been shown in equation (3) the time base difference between two location anchors changes over time but it can be modelled in a as a simple function e.g. as a straight line at least within a certain time interval of observation. FIG. 7 is a visualization of the time base differences between two location anchors A1, A2 and the TDOAs calculated from the TOAs between two location anchors when one location anchor is also the originator of the message.

In case A1 is the originator the TDOAs $TDOA_{A_1,A_1,A_2}$ as introduced in equation (8) are plotted as +701. A straight line 710 is estimated from these TDOA measurements 701. In case A2 is the originator the TDOAs $TDOA_{A_2,A_1,A_2}$ are plotted as ×702. A straight line 720 is estimated from these TDOA measurements 702. Since the multipath error and geometry caused propagation time effect those lines with opposite signs the error free time base offset is the straight line 730 in between. Thus the error free time base offset between the two location anchors can be estimated for any time for which the function 730 which in this example is a piece of a straight line for illustration purposes, can be estimated.

Figure 8:
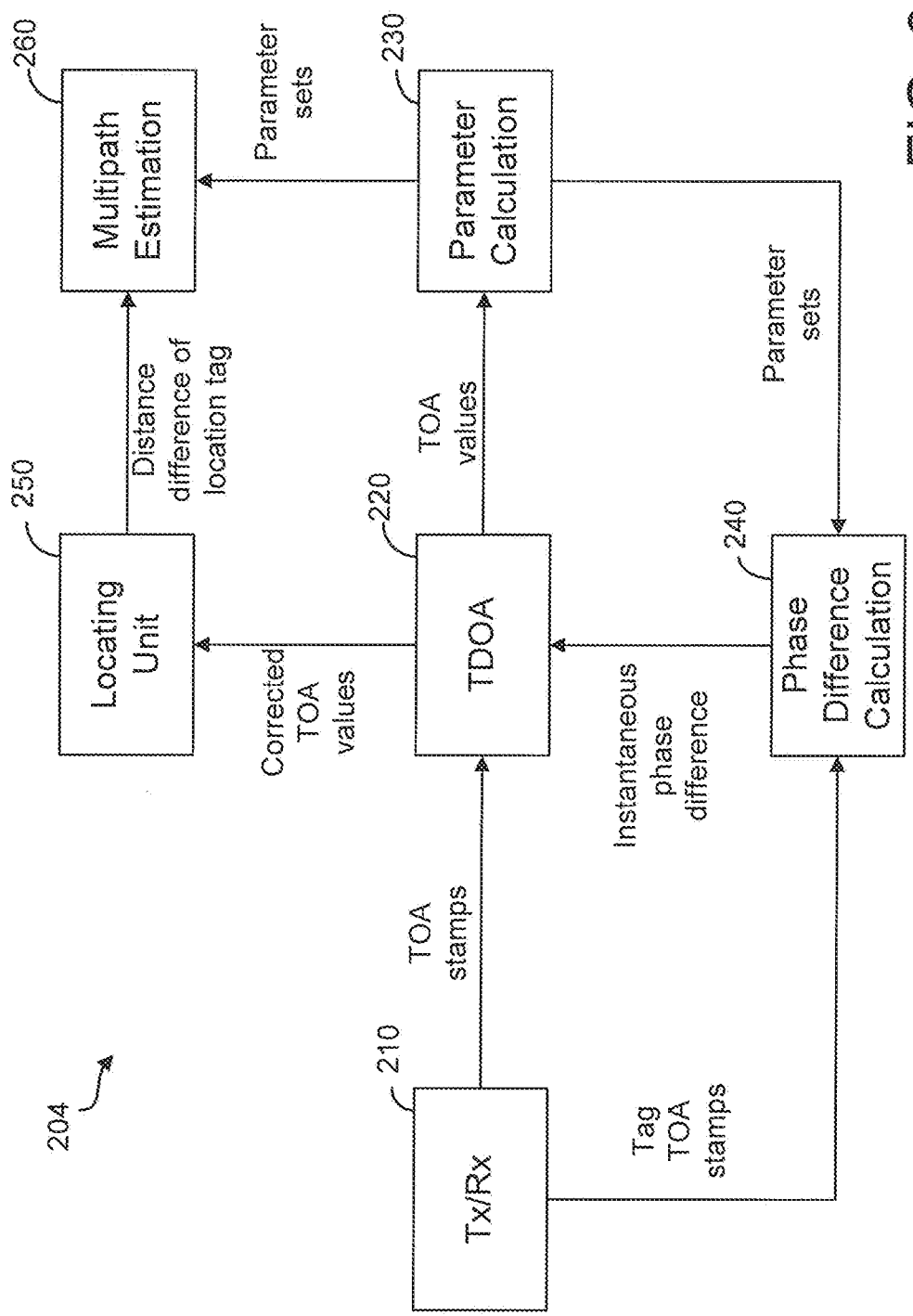
FIG. 8 shows a block diagram of a location anchor, according to an embodiment of the present invention.

A location server, according to an embodiment of the present invention, is shown in FIG. 8. As shown in FIG. 8, the location server 204 comprises a transmitting/receiving part 210 configured to receive pairs of TOA stamps from a first and a second location anchors (not shown) and to provide the TOA stamps to a TDOA unit 220 configured to calculate TDOA values. The location server 204 further comprises a parameter estimation unit 230 configured to determine first and second sets of parameters from the calculated TDOA values; and a phase-difference determination unit 240 configured to calculate the instantaneous phase difference from either some or all elements of the determined sets of parameters. The location server may comprise a multipath estimation unit 260 configured to calculate a message propagation time span using the known locations of the first and second location anchors and a known speed of signal propagation in the broadcast medium; and to calculate a multipath error of the reception time, using only a difference between elements of the determined sets of parameters of the first and second clock model functions, and using the message propagation time span.

The location server 204 is configured to determine a difference of distances of a location tag from at least two location anchors, the location of the location tag being unknown and the respective locations of the location anchors being known to a location server, wherein the transmitting/receiving part 210 is configured to receive, from the first and second location anchors, tag TOA stamps, which are indicative of a first and second time of reception of the tag message broadcast by the location tag at the first and second location anchor, respectively, in terms of the time base of the first and second location anchor, respectively. The phase-difference determination unit 240 is also configured to determine an instantaneous phase difference between time bases of the first and second location anchors for the time at which the tag message has been received by one of the anchors. The TDOA unit 220 is configured to determine a TDOA value for the tag message from the first and second TOA stamps and to correct the determined TDOA value by the determined instantaneous phase difference, thus obtaining a corrected TDOA value. The location server 204 also comprises a locating unit 250 configured to determine a difference in distance of the location tag from the first and second location anchor, using the corrected TDOA value and a known speed of signal propagation within a broadcast medium used by the first and second location anchors and by the location tag.

What is claimed is:

1. A method for determining an instantaneous phase difference between time bases of at least two location anchors for a desired point in time, each of the location anchors having transmitting and receiving access to a joint broadcast transmission medium and a respective time base for measuring time, the method comprising:
   a first of the location anchors broadcasting a first broadcast message at least twice, that is, at different times;
   the first location anchor and at least a second of the location anchors receiving the first broadcast messages;
   said at least second location anchor broadcasting a second broadcast message at least twice, that is, at different times;
   said at least second location anchor and at least the first location anchor receiving the second broadcast messages;
   the first and said at least second location anchors each generating time-of-arrival stamps, hereinafter TOA stamps, which are indicative of respective first and second times of reception of the first and second broadcast messages in terms of their respective time base, wherein the first and said at least second location anchor not only generates TOA stamps for the broadcast messages received from the respective other of the first and said at least second location anchors, but also TOA stamps for the broadcast messages received from the respective same location anchor itself;
   the first and said at least second location anchor providing the generated TOA stamps to a location server so as to provide the location server an identification of also the location anchor broadcasting the broadcast message subject to a respective TOA stamp, of the location anchor receiving the broadcast message subject to a respective TOA stamp, and of the broadcast message;
   the location server calculating time-difference-of-arrival values, hereinafter TDOA values, from each pair of collected TOA stamps that pertains to one of the first and second broadcast messages;
   the location server, using at least two of the calculated TDOA values each pertaining to the broadcast messages broadcast by a respective one of the first and second location anchor, respectively, determining first and second set of parameters that define a first and a second clock model function of time, respectively, the first clock model function describing a time dependence of the TDOA values of the broadcast messages transmitted by the first location anchor only, and the second clock model function describing a time dependence of the TDOA values of the broadcast messages transmitted by the second location anchor only;
   the location server calculating the instantaneous phase difference from the determined first and second clock model functions and from a time elapsed between a reference point in time and the desired point in time t.

2. The method of claim 1, wherein the first and second clock model functions are linear functions, and wherein calculating the instantaneous phase difference comprises determining first and second sets of parameters of the first and second clock model functions, a respective first parameter value corresponding to an offset of the respective linear function, and determining, for at least one of the first and second clock model functions, a respective second parameter value corresponding to a slope of the respective linear function.

3. The method of claim 1, wherein at least three location anchors, in respective pairwise associations, broadcast and receive broadcast messages, and provide their TOA stamps to the location server, the method further comprising
   determining respective instantaneous phase differences of the time bases of the different pairs of the location anchors, by performing the method according to claim 1 individually for the different location anchor pairs.

4. The method of claim 1, comprising
   at least one of the location anchors and the location server monitoring a physical quantity indicative of a predetermined characteristic of a transmission channel used for the broadcast messages;
   the location server or the location anchors adapting a time schedule for broadcasting the broadcast messages in dependence on an instantaneous value of the physical quantity.

5. A method for determining a difference of distances of a location tag from at least two location anchors, the location of the location tag being unknown and the respective locations of the location anchors being known to a location server, the method comprising:
   the location tag broadcasting a tag message;
   a first and a second of the location anchors receiving the tag message;
   the first and second location anchors generating first and second tag message time-of-arrival stamps, herein after tag TOA stamps, which are indicative of a first and second time of reception of the tag message at the first and second location anchor, respectively, in terms of the time base of the first and second location anchor, respectively;
   the first and second location anchors providing the generated respective tag TOA stamps to the location server;
   the location server determining a TDOA value for the tag message from the first and second tag TOA stamps;
   the location server determining an instantaneous phase difference between time bases of the first and second location anchors for a time at which the tag message was received by one of the location anchors;
   the location server correcting the determined TDOA value by the determined instantaneous phase difference, thus obtaining a corrected TDOA value;
   the location server determining a difference in distance of the location tag from the first and second location anchor, using the corrected TDOA value and a known speed of signal propagation within the broadcast medium;

wherein determining the instantaneous phase difference between the time bases of the first and second location anchors comprises performing a method according to claim 1.

6. A method for determining a location of a location tag in terms of an at least one-dimensional coordinate system, comprising performing the method of claim 5 for at least two different pairs of location anchors formed by at least three location anchors, namely the first, the second and a at least a third location anchor;

the location server calculating differences in distance of the location tag from at least two different pairs formed by the first, second and third location anchors;

the location server determining the location of the location tag as the location that exhibits all calculated distance differences between the tag and the at least two different pairs formed by the first, second and third location anchors.

7. A method for operating a location server in determining an instantaneous phase difference between time bases of at least two location anchors at a desired point in time, each location anchor having a respective time base for measuring time, the method comprising:

the location server receiving, from a first and a second location anchor, pairs of TOA stamps, which are indicative of respective first and second times of reception of first and second messages in terms of their respective time base, wherein the location server receives from the first and second location anchor not only TOA stamps for messages broadcast from one and received by the respective other location anchor, but also TOA stamps for messages broadcast and received from the respective same location anchor itself;

the location server calculating time-difference-of-arrival values, hereinafter TDOA values, from each pair of collected TOA stamps that pertains to one of the first and the second message, respectively;

the location server, using at least two of the calculated TDOA values each pertaining to the broadcast messages broadcast by a respective one of the first and second location anchor, respectively, determining first and second set of parameters that define a first and a second clock model function of time, respectively, the first clock model function describing a time dependence of the TDOA values of the broadcast messages transmitted by the first location anchor only, and the second clock model function describing a time dependence of the TDOA values of the broadcast messages transmitted by the second location anchor only;

the location server calculating the instantaneous phase difference from the determined first and second clock model functions and from a time elapsed between a reference point in time and the desired point in time t.

8. The method of claim 7, comprising the location server additionally determining the instantaneous phase differences between the time bases of the second location anchor and a third location anchor;

the location server calculating an instantaneous phase difference between the time bases of the first and the third location anchor only from the determined instantaneous phase differences between the time bases of the first and second location anchors and between the second and the third location anchors.

9. The method of claim 7, further comprising the location server scheduling a time of transmission of the broadcast messages by the location anchors using a time schedule and triggering the location anchors in accordance with the time schedule.

10. The method of claim 7, further comprising the location server determining a message propagation time span using the known locations of the first and second location anchors and a known speed of signal propagation in the broadcast medium;

the location server determining a multipath error of the reception time at the desired point in time, using a difference between elements of the determined sets of parameters of the first and second clock model function and the message propagation time span.

11. A method for operating a location server in determining a difference of distances of a location tag from at least two location anchors, the location of the location tag being unknown and the respective locations of the location anchors being known to a location server, the method comprising;

the location server receiving, from the first and second location anchors, tag TOA stamps, which are indicative of a first and second time of reception of the tag message broadcast by the location tag at the first and second location anchor, respectively, in terms of the time base of the first and second location anchor, respectively;

the location server determining a TDOA value for the tag message from the first and second TOA stamps;

the location server determining an instantaneous phase difference between time bases of the first and second location anchors for the time at which the tag message is received by one of the location anchors;

the location server correcting the determined TDOA value by the determined instantaneous phase difference, thus obtaining a corrected TDOA value;

the location server determining a difference in distance of the location tag from the first and second location anchor, using the corrected TDOA value and a known speed of signal propagation within the broadcast medium;

wherein determining the instantaneous phase difference between the time bases of the first and second location anchors comprises performing a method according to claim 7.

12. A method for operating a first location anchor in determining an instantaneous phase difference between time bases of at the first location anchor and at least a second location anchor at a desired point in time, each of the first location anchor and said at least second location anchor having transmitting and receiving access to a joint broadcast transmission medium and a respective time base for measuring time, the method comprising:

the first location anchor broadcasting a first broadcast message at least twice, that is, at different times;

the first location anchor receiving the first broadcast messages;

the first location anchor receiving second broadcast messages from said at least second location anchor at least twice, that is, at different times;

the first location anchor generating time-of-arrival stamps, hereinafter TOA stamps, which are indicative of respective first and second times of reception of the first and second broadcast messages in terms of the time base of the location anchor, wherein the first location anchor not only generates TOA stamps for the broadcast messages received from said at least second location anchor, but also TOA stamps for the broadcast messages received from the subject location anchor itself;

the first location anchor providing the generated TOA stamps to a location server so as to provide the location server an identification of also the first location anchor broadcasting the broadcast message subject to a respective TOA stamp, of the first location anchor receiving the broadcast message subject to a respective TOA stamp, and of the broadcast message.

13. The method of claim 12, further comprising the first location anchor scheduling respective times of transmission of the first or second broadcast messages at an individual time schedule, in particular a random time schedule.

14. A location server, comprising a receiving part configured to receive, from a first and a second location anchor, pairs of TOA stamps, which are indicative of respective first and second times of reception of first and second messages in terms of their respective time base, that is, not only TOA stamps for messages broadcast from one and received by the respective other location anchor, but also TOA stamps for messages broadcast and received from the respective same location anchor itself;

a TDOA unit configured to calculate time-difference-of-arrival values, hereinafter TDOA values from each pair of collected TOA stamps that pertains to one of the first and the second message, respectively;

a parameter estimation unit, which is configured to determine, using at least two of the calculated TDOA values each pertaining to one of the messages transmitted by a respective one of the first and second location anchors, respectively, first and second sets of parameters that define a first and a second clock model function, respectively, the first clock model function describing a time dependence of the TDOA values of the messages broadcast by the first location anchor only, and the second clock model function describing a time dependence of the TDOA values of the messages broadcast by the second location anchor only;

a phase-difference determination unit, which is configured to calculate the instantaneous phase difference from either some or all elements of the determined sets of parameters of the first and second clock model functions, and from a time elapsed between a reference point in time and the desired point in time t.

15. The location server of claim 14, which is configured to determine a difference of distances of a location tag from at least two location anchors, the location of the location tag being unknown and the respective locations of the location anchors being known to a location server, wherein the receiving part is configured to receive, from the first and second location anchors, tag TOA stamps, which are indicative of a first and second time of reception of the tag message broadcast by the location tag at the first and second location anchor, respectively, in terms of the time base of the first and second location anchor, respectively;

the phase-difference determination unit is configured to determine instantaneous phase difference between time bases of the first and second location anchors for the time at which the tag message is has been received by one of the anchors;

the TDOA unit is configured to determine a TDOA value for the tag message from the first and second TOA stamps and to correct the determined TDOA value by the determined instantaneous phase difference, thus obtaining a corrected TDOA value;

a locating unit comprised by the location server is configured to determine a difference in distance of the location tag from the first and second location anchor, using the corrected TDOA value and a known speed of signal propagation within a broadcast medium used by the first and second location anchors and by the location tag.

16. The location server of claim 15, further comprising a multipath estimation unit, which is configured to calculate a message propagation time span using the known locations of the first and second location anchors and a known speed of signal propagation in the broadcast medium;

calculate a multipath error of the reception time, using only a difference between elements of the determined sets of parameters of the first and second clock model functions, and using the message propagation time span.

17. A location anchor, comprising a transmitting and receiving part, which is configured to have transmitting and receiving access to a joint broadcast transmission medium shared with at least a second location anchor, a time base for measuring time; wherein the transmitting and receiving part is additionally configured to broadcast a first broadcast message at least twice, that is, at different times, and to receive the first broadcast messages; and to receive second broadcast messages from a second location anchor at least twice, that is, at different times;

a TOA unit, which is configured to generate time-of-arrival stamps, hereinafter TOA stamps, which are indicative of respective first and second times of reception of the first and second broadcast messages in terms of the time base of the location anchor, wherein TOA unit is not only configured to generate TOA stamps for the second broadcast messages received from said at least location anchor, but also TOA stamps for the first broadcast messages received from the claimed location anchor itself;

wherein the location anchor is additionally configured to provide the generated TOA stamps at an interface for communicating with a location server so as to provide the location server an identification of also the location anchor broadcasting the broadcast message subject to the respective TOA stamp, of the location anchor receiving the broadcast message subject to the respective TOA stamp, and of the broadcast message subject to the respective TOA stamp.

18. A non-transitory computer readable storage medium, comprising software code portions stored therein for performing the steps of the method of claim 7 when said product is run on a computer.

19. A non-transitory computer readable storage medium, comprising software code portions stored therein for performing the steps of the method of claim 12 when said product is run on a computer.

* * * * *

UNITED STATES PATENT AND TRADEMARK OFFICE
CERTIFICATE OF CORRECTION

PATENT NO. : 9,983,292 B2
APPLICATION NO. : 13/472878
DATED : May 29, 2018
INVENTOR(S) : Rainer Hach and Albrecht Rommel Page 1 of 1

It is certified that error appears in the above-identified patent and that said Letters Patent is hereby corrected as shown below:

In the Claims

1. In Claim 12 at Line 3 (Column 20, Line 49), please delete the word "at".

2. In Claim 12 at Line 20 (Column 20, Line 66), please insert the word --first-- after the word "at".

Signed and Sealed this
Twenty-first Day of August, 2018

Andrei Iancu
*Director of the United States Patent and Trademark Office*